E. M. T. RYDER.
VEHICLE BODY.
APPLICATION FILED FEB. 4, 1920.
1,413,192.
Patented Apr. 18, 1922.
3 SHEETS—SHEET 3.
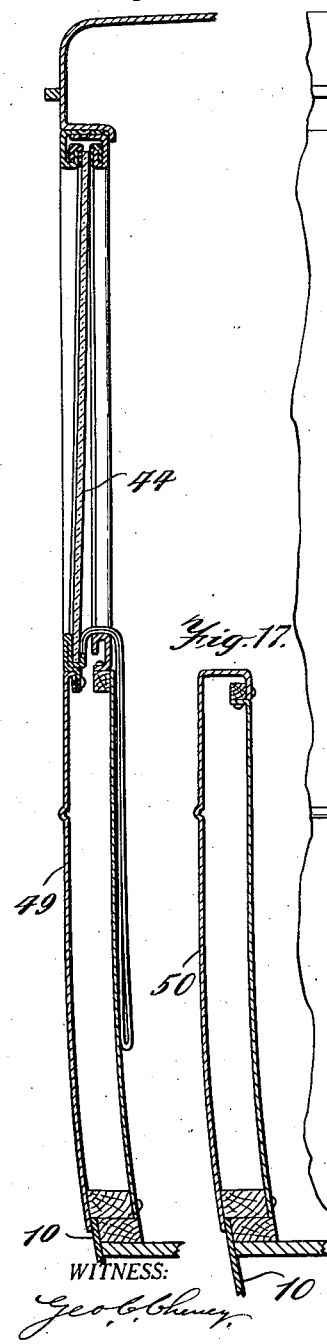
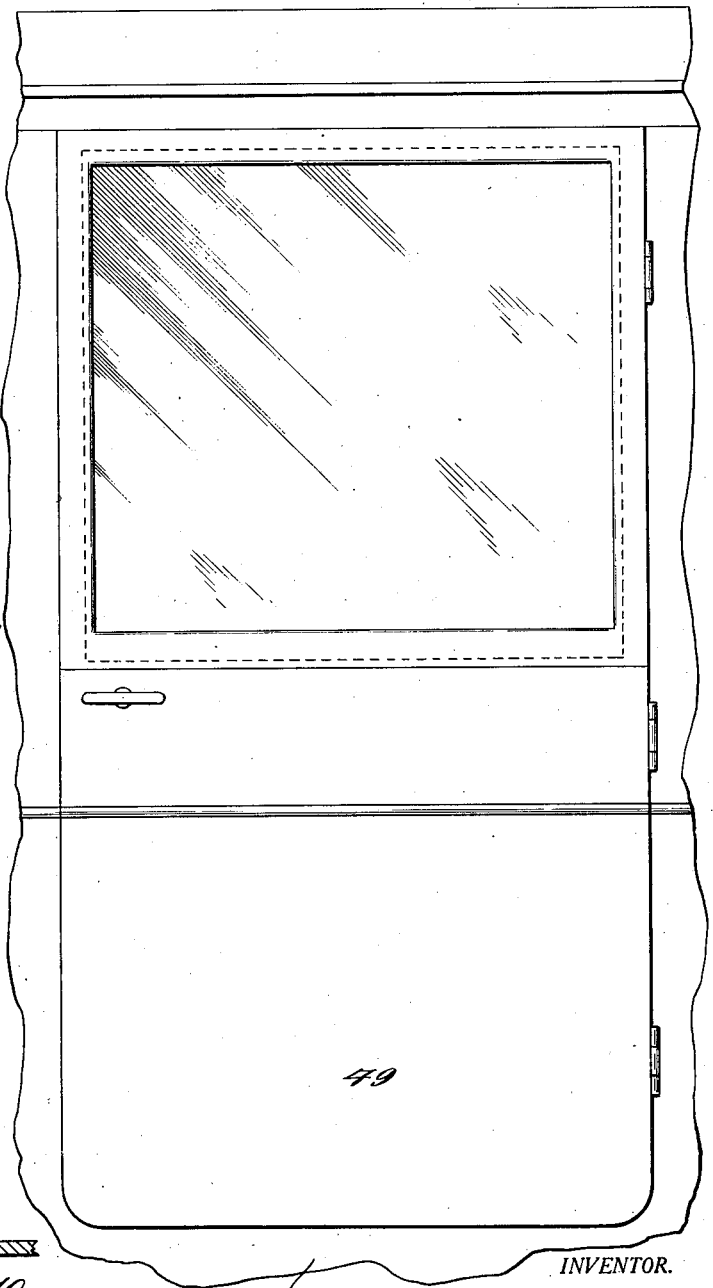

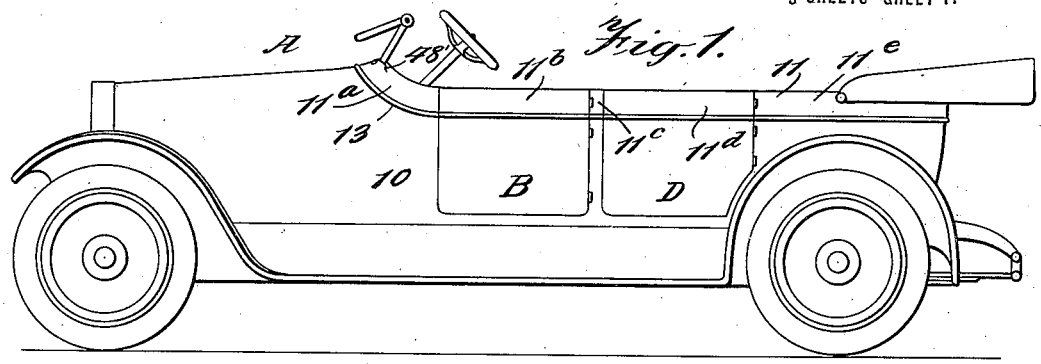
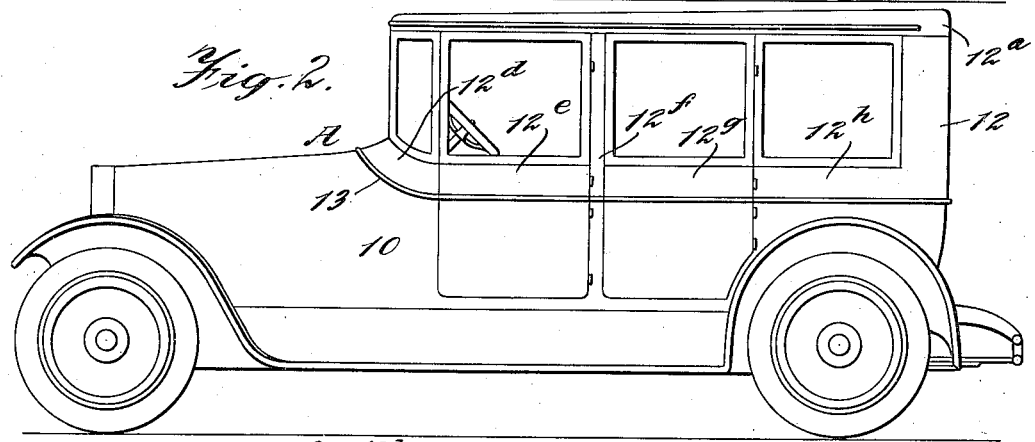
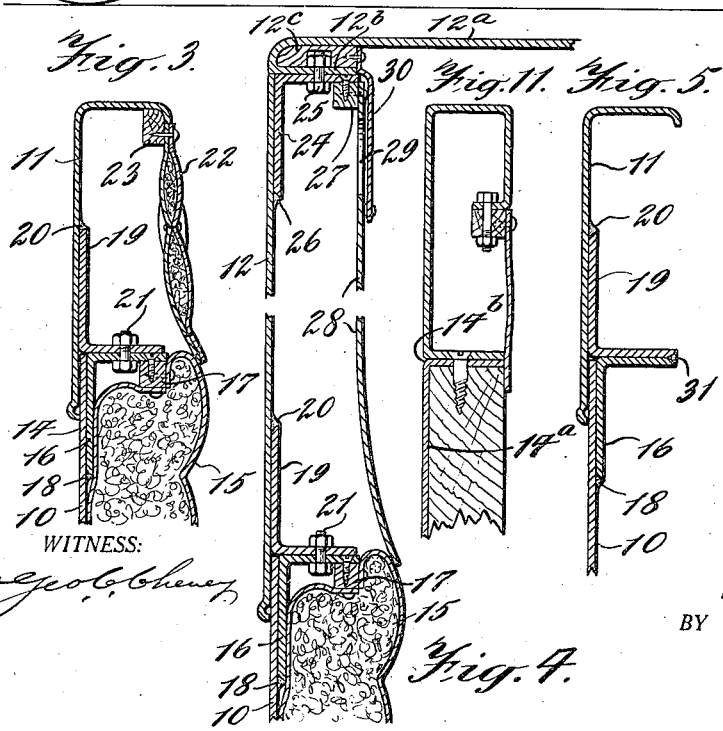

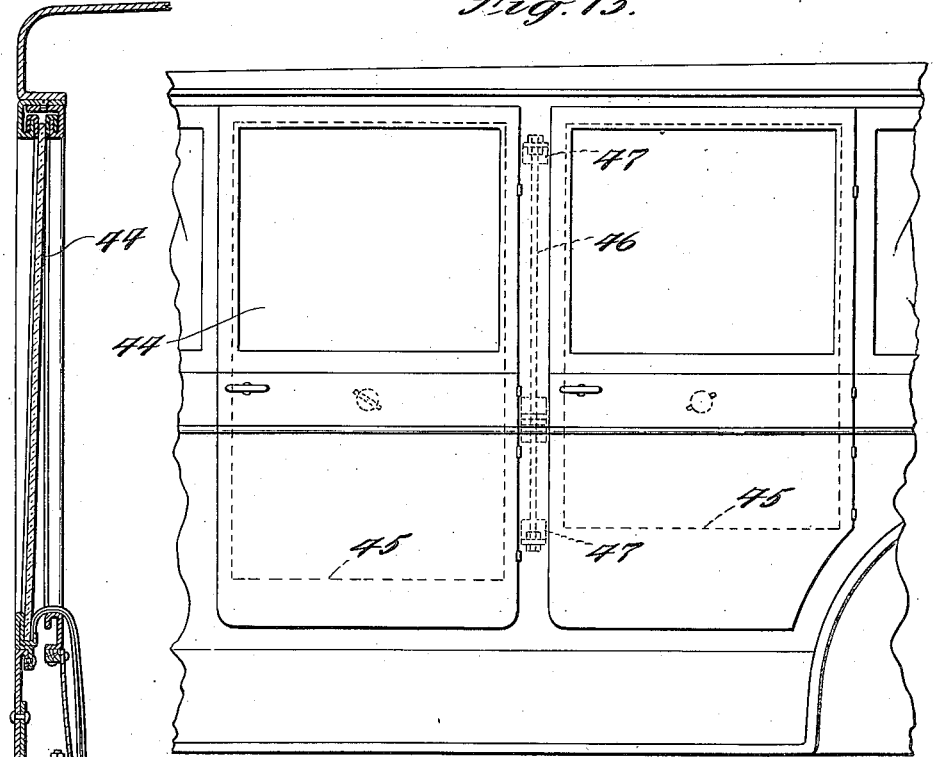

UNITED STATES PATENT OFFICE.

ELY M. T. RYDER, OF YONKERS, NEW YORK.

VEHICLE BODY.

1,413,192.  Specification of Letters Patent. Patented Apr. 18, 1922.

Application filed February 4, 1920. Serial No. 356,290.

*To all whom it may concern:*

Be it known that I, ELY M. T. RYDER, a citizen of the United States, residing at Yonkers, in the county of Westchester and State of New York, have invented certain new and useful Improvements in Vehicle Bodies, of which the following is a specification.

My invention more particularly relates to a vehicle body comprising an unfinished body portion and one or more top members constructed and arranged to be secured to the top of said unfinished body and form therewith a completed body of a finished appearance.

It has hitherto been common for car owners to have separate cars for summer and for winter use. In accordance with my invention, a single car or vehicle may be used throughout the year by interchanging the top members, and in either case, the completed car presents the finished appearance of an ordinary car.

Other objects of my invention will appear in the specification and will be particularly pointed out in the claims.

My invention will best be understood by reference to the accompanying drawings, in which like reference characters indicate like parts, and in which Figure 1 is a side view of an automobile embodying my invention, and having an open top member made in accordance with my invention applied thereto; Fig. 2 is a side view of the same car provided with an enclosed top made in accordance with my invention; Fig. 3 is a sectional detail view through the top member and the adjacent portion of the upper part of an unfinished body of a car; Fig. 4 is a view, similar to Fig. 3, illustrating a section of an enclosed top in position on the body portion; Figs. 5 and 6 are sectional views illustrating different methods of securing the top member to the body member; Fig. 7 is a detail sectional view illustrating a modified form of my invention; Figs. 8 and 9 are sectional detail views illustrating another modified form; Figs. 10 and 11 are detail sectional views illustrating my invention embodied in cars having wooden bodies; Fig. 12 is a sectional view through one side of an enclosed car embodying my invention, illustrating how the window may be lowered within the body of the car; Fig. 13 is a fragmentary side view of a vehicle body embodying my invention; Fig. 14 is a fragmentary side view illustrating a support for the wind shield; Fig. 15 is a fragmentary side elevation of a vehicle body embodying my invention and provided with a door formed in a single piece; Fig. 16 is a vertical section taken through the door of Fig. 15, and Fig. 17 is a similar section through a door for use with an open body.

Referring, now, to the drawings, A indicates a vehicle, here shown as an automobile, embodying my invention. The body of the car comprises an unfinished body portion 10, to which may be secured a top member 11 to form an open body, as illustrated in Fig. 1, or an enclosed top member 12, as indicated in Fig. 2, the parts 11 and 12 being made to form, with the unfinished body of the car, a completed body having a finished and harmonious appearance, the line of division between the top member and the unfinished body of the car being indicated in Figs. 1 and 2 at 13. It will be apparent that the top member conforms to the contour of the top, of the unfinished body and forms a continuous engagement therewith.

Referring, now, particularly to Fig. 3, I have there illustrated my invention in connection with a car of which the body is formed of sheet metal 14 of sufficient rigidity to impart the required strength to the car body. Upholstery 15 may be secured to the inside of the body of the car in a known manner. In this figure I have illustrated one of the various ways in which the top member, which is here shown as an open top member, may be secured to the top of the unfinished part of the body. In the form of my invention here illustrated, one of the sides of an angle iron 16 is placed against the inner side of the metal body 14, the horizontal flange of the angle iron coming flush with the top of the body and extending inwardly therefrom. A wooden rib 17 may be secured to the under side of the horizontal flange of the angle iron, and at the inner end thereof, as indicated, and forms a convenient support for the upholstery. The lower end of the angle iron may be welded to the inner side of the metal body, as at 18, the welding being continuous or at separated spots, as desired, and in accordance with the requirements of the particular case. The top section 11 is secured to the unfinished body by an angle iron 19, one side of which is welded to the main plate of the top member, as at 20; the horizontal flange of the angle iron being secured to the other angle iron by means of a bolt 21. The inner side of the top member may be closed by flexible upholstery, as indicated at 22, which may be secured to a wooden rib 23, as indicated. The flexible upholstery may readily be lifted to afford access to the bolt 21 in order to remove the top member from the unfinished body.

The top member is formed in sections, as $11^a$, $11^b$, $11^c$, $11^d$, and $11^e$ (see Fig. 1), separate sections $11^b$ and $11^d$ being provided for the side doors B and D, respectively, as indicated in Fig. 1. The sectional arrangement of the top member permits of its storage, when not in use, in the minimum of space. This will enable many car owners having small garages themselves to store the spare top member during the season when they are not in use instead of hiring extra space for storing equipment not in use.

When it is desired to change the car from the open type to the closed type for winter use, the open top member, indicated in Fig. 3, is removed and the enclosed top member is secured in position, in the manner illustrated in Fig. 4. In this figure, the top member is secured to the unfinished body member in precisely the same manner as is the open top member, illustrated in Fig. 3, and the corresponding securing parts are indicated by the same reference numerals. The enclosed body, illustrated in Figs. 2 and 4, is also of the collapsible type, and is provided with a removable cover member $12^a$, which, in the case shown, has a metal frame and is preferably provided on its outer edge with an inwardly extending flange $12^b$ spaced from the top plate, as indicated. The cover member $12^a$ is preferably secured to an agle iron 24, which is secured to the inner and top portion of the top member 12 by a bolt 25, the angle iron being welded to the main metal plate of the top member, as at 26. A wooden rib 27 may conveniently be secured to the under and inner end of the horizontal flange of the angle iron 24 to form a support for an inner cover member 28, provided at its upper side with one or more openings 29, which afford access to the bolt 25. A bar $12^c$ of wood or the like is preferably secured between the top plate $12^a$ and the flange $12^b$, and is provided with an opening for the reception of the upper end of the bolt 25 and the nut which is secured thereto. The bar $12^c$ forms, also, a convenient support for a depending cover 30, which may be of upholstery, and which covers the opening 29.

The upright portion of the enclosed top member is also formed in sections, as at $12^d$, $12^e$, $12^f$, $12^g$ and $12^h$, as indicated in Fig. 2. The collapsible feature is of special importance in connection with the enclosed top member and permits the storage thereof in a small space.

Fig. 5 illustrates a different method of securing the two angle irons together, the two horizontal and adjacently disposed flanges of the two angle irons being welded, as at 31, the welded part being readily cut when the top members are to be changed.

Fig. 6 is a view, similar to Fig. 5, illustrating the two angle members secured together by rivets 32.

In Figs. 1 to 6 the line of division between the unfinished body and the under side of the top member is located substantially below the top of the finished body.

Fig. 7 illustrates the upper part of an unfinished body section, indicated at $10^a$, which is converted to a summer body by a cover plate 33, which is secured to the top of the unfinished body by bolts 34, the cover being provided with a depending member which may be of upholstery 35 which covers an access opening 36. An angle iron 37 is preferably placed within the top of the unfinished body section and forms a support for the bolts 34, the angle iron being welded to the metal body plate at 38.

In the form of my invention illustrated in Fig. 8, the top part of the body $10^b$ is depressed, as at 39, to form a recess, as at 40, within which a plate 41 is secured, as by screws, to complete the open type body. The body is converted to the enclosed type by removing the plate 41 and securing an enclosed top body in position, in the manner indicated in Fig. 9. In Figs. 7, 8 and 9 the line of division between the unfinished body and the under side of the top member is close to the top of the finished body.

Fig. 10 illustrates my invention in connection with a car having a body formed of wood, as at 42, the top member being secured thereto by means of splice bars 43.

Fig. 11 illustrates my invention in connection with a wooden body, which is covered by a metal plate $14^a$, the top of which in the case shown is bent over the top of the wood, as indicated at $14^b$. In this form, also, the horizontal securing flange of the top member is secured directly to the wood of the car and no angle irons are required.

Figs. 12 and 13 illustrate the arrangement by which the windows 44 may be lowered within the body of the car to the positions indicated by dotted lines, as at 45 in Fig. 13. This feature of so forming the unfinished body that the windows may be lowered therein is of great importance, and is one not found in the present types of detachable closed bodies which are fastened to the usual standard type of open body and in which no provision for the lowering of the windows into the body is or can be made. Fig. 13 also illustrates an additional fastening or stiffening means between the enclosed top member and the unfinished body member, the same comprising a bar or rod of wood or metal 46 suitably secured at either end as to angle bars 47, as indicated in dotted lines.

In Fig. 14 is illustrated a modified support for the wind shield, in which studs or bolts are extended from the wind shield to the base, as indicated in dotted lines at 48, as distinguished from the form illustrated in Fig. 1, in which the wind shield is secured to the top member at 48.

In Figs. 15, 16 and 17, I have illustrated a modified form of my invention in which the doors are made in a single piece, separate doors being provided for the enclosed and for the open car. I have illustrated at 49 (see Figs. 15 and 16) a door formed in one piece for use with an enclosed car and at 50 (see Fig. 17) a separate door for use with an open car, the upper level of the door, in this case, coming above the top of the unfinished body.

While I have illustrated my invention in connection with interchangeable open and closed top members, it will be apparent that it is equally applicable to interchangeable open top members or interchangeable closed top members.

It will be apparent that in accordance with my invention, a single car or vehicle may be used both in the summer and winter merely by changing the top members, and that in each case the car presents the finished appearance of an ordinary car.

What I claim and desire to secure by Letters Patent of the United States is:—

1. In combination, an unfinished vehicle body, and interchangeable open and closed top members arranged to be secured to said unfinished body, the line of division between the unfinished body and either top member when in position being substantially below the level of the top of the body as finished by the addition of the open top member.

2. In combination, an unfinished vehicle body, and a top member arranged to be fitted against the top of said unfinished vehicle body and be removably secured directly thereto at a line below the level of the body as finished by the addition of said top member.

3. In combination, an unfinished vehicle body with unfinished doors and interchangeable open and closed top members formed in sections, including sections completing the doors, all sections of the top members being constructed and arranged to be removably secured to the top of said unfinished body and unfinished doors at a line substantially below the level of the top of the body as finished by the addition of the open top member.

4. In combination, a vehicle body unfinished at its top, interchangeable open and closed top members constructed and arranged to conform to the contour of the top of said unfinished body and forming a continuous engagement therewith, and means for securing said top members against the unfinished top of the vehicle body at a line below the level of the top of the body as finished by the addition of the open top member.

ELY M. T. RYDER.